US012650207B2

(12) United States Patent
Rustomji et al.

(10) Patent No.: US 12,650,207 B2
(45) Date of Patent: Jun. 9, 2026

(54) APPARATUS FOR MAINTAINING LIQUEFIED GAS COMPOSITION DURING DISPENSE

(71) Applicant: SOUTH 8 TECHNOLOGIES, INC., San Diego, CA (US)

(72) Inventors: Cyrus Rustomji, San Diego, CA (US); James Royer, San Diego, CA (US); Elena Machado, San Diego, CA (US); John Kearney, San Diego, CA (US)

(73) Assignee: South 8 Technologies, Inc., San Diego, CA (US)

( * ) Notice: Subject to any disclaimer, the term of this patent is extended or adjusted under 35 U.S.C. 154(b) by 0 days.

(21) Appl. No.: 19/349,247

(22) Filed: Oct. 3, 2025

(65) Prior Publication Data

US 2026/0098612 A1 Apr. 9, 2026

Related U.S. Application Data

(60) Provisional application No. 63/703,274, filed on Oct. 4, 2024.

(51) Int. Cl.
*F17C 7/02* (2006.01)
*F17C 13/02* (2006.01)

(52) U.S. Cl.
CPC .............. *F17C 7/02* (2013.01); *F17C 13/025* (2013.01); *F17C 13/026* (2013.01); (Continued)

(58) Field of Classification Search
CPC ........ F17C 7/02; F17C 13/025; F17C 13/026; F17C 2223/0153; F17C 2223/036; (Continued)

(56) References Cited

U.S. PATENT DOCUMENTS 5,409,046 A * 4/1995 Swenson .................. F17C 9/02 141/2
5,549,142 A * 8/1996 Beale ........................ F17C 6/00 141/49

(Continued)

FOREIGN PATENT DOCUMENTS

CN 211339121 8/2020
CN 117329751 1/2024

(Continued)

OTHER PUBLICATIONS

International Search Report and the Written Opinion of the International Searching Authority for PCT/US2025/049382 dated Dec. 10, 2025, 15 Pages.

*Primary Examiner* — Joel M Attey
*Assistant Examiner* — Ibrahim A. Michael Adeniji
(74) *Attorney, Agent, or Firm* — Manuel De La Cerra

(57) ABSTRACT

Apparatus and methods maintain constant composition of multi-component liquefied-gas mixtures (e.g., for battery electrolytes or refrigerants) during dispensing by transferring vapor from a second container to a first to compensate for selective evaporation. Embodiments use heating, constant-pressure cylinders, pumps, or cycled intermediate cylinders, with sensors for control. Systems enable full utilization with minimal waste, scalable for industrial applications.

24 Claims, 9 Drawing Sheets

(52) U.S. Cl.
CPC *F17C 2223/0153* (2013.01); *F17C 2223/036* (2013.01); *F17C 2225/0153* (2013.01); *F17C 2227/0107* (2013.01); *F17C 2227/0304* (2013.01); *F17C 2227/0372* (2013.01); *F17C 2250/032* (2013.01); *F17C 2250/043* (2013.01); *F17C 2250/0439* (2013.01); *F17C 2250/0626* (2013.01); *F17C 2260/02* (2013.01)

(58) Field of Classification Search
CPC ...... F17C 2225/0153; F17C 2227/0107; F17C 2227/0304; F17C 2227/0372; F17C 2250/032; F17C 2250/043; F17C 2250/0439; F17C 2250/0626; F17C 2260/02
See application file for complete search history.

(56) References Cited

U.S. PATENT DOCUMENTS

| | | | | | |
|---|---|---|---|---|---|
| 6,000,230 | A * | 12/1999 | Kanno | F17C 7/00 141/47 |
| 2002/0083719 | A1 * | 7/2002 | Hughes | F17C 5/02 62/53.2 |
| 2014/0263357 | A1 * | 9/2014 | DeVarney | F17C 13/084 220/560.04 |
| 2015/0027136 | A1 * | 1/2015 | Desjardins | F17C 7/02 62/50.7 |
| 2017/0320588 | A1 * | 11/2017 | Briand | B64D 37/06 |
| 2018/0112824 | A1 * | 4/2018 | Gaddis | F17C 7/02 |
| 2019/0277450 | A1 * | 9/2019 | Gustafson | F17C 5/00 |
| 2022/0349526 | A1 * | 11/2022 | Kubica | F17C 3/08 |
| 2024/0093836 | A1 * | 3/2024 | Wikus | F17C 6/00 |

FOREIGN PATENT DOCUMENTS

| | | | | |
|---|---|---|---|---|
| CN | 117329751 A | * | 1/2024 | F25D 3/10 |
| WO | 2016/120003 | | 8/2019 | |

* cited by examiner

APPARATUS FOR MAINTAINING LIQUEFIED GAS COMPOSITION DURING DISPENSE

CROSS-REFERENCE TO RELATED APPLICATIONS

This application claims the benefit of U.S. Provisional Patent Application No. 63/703,274, filed Oct. 5, 2024, entitled "APPARATUS FOR MAINTAINING LIQUEFIED GAS COMPOSITION DURING DISPENSE," the entire contents of which are incorporated herein by reference.

This application is related to the following applications and patents, each of which is incorporated herein by reference in its entirety: U.S. Pat. No. 10,608,284, issued Mar. 31, 2020; U.S. Pat. No. 10,998,143, issued May 4, 2021; U.S. Pat. No. 10,784,532, issued Sep. 22, 2020; U.S. Pat. No. 11,088,396, issued Aug. 10, 2021; U.S. Pat. No. 10,873,070, issued Dec. 22, 2020; U.S. Pat. No. 11,342,615, issued May 24, 2022; U.S. Pat. No. 11,049,668, issued Jun. 29, 2021; U.S. Pat. No. 11,984,614, issued May 14, 2024; U.S. Pat. No. 11,958,679, issued Apr. 16, 2024; PCT/US22/31594, filed May 31, 2022; PCT/US23/17720, filed Apr. 6, 2023; PCT/US23/28104, filed Jul. 19, 2023; PCT/US23/28105, filed Jul. 19, 2023; PCT/US24/16784, filed Feb. 21, 2024; PCT/US24/18746, filed Mar. 6, 2024; PCT/US24/33428, filed Jun. 11, 2024; PCT/US24/25771, filed Apr. 23, 2024; PCT/US24/31912, filed May 31, 2024; U.S. Provisional Application No. 63/534,213, filed Aug. 22, 2023; U.S. Provisional Application No. 63/418,703, filed Oct. 24, 2022; PCT/US24/27501, filed May 2, 2024; PCT/US24/31325, filed May 29, 2024; U.S. Provisional Application No. 63/652,616, filed May 28, 2024; PCT/US24/40203, filed Jul. 30, 2024; U.S. application Ser. No. 18/788,809, filed Jul. 30, 2024; U.S. application Ser. No. 18/643,134, filed Apr. 23, 2024; U.S. application Ser. No. 18/807,938, filed Aug. 17, 2024; U.S. Provisional Application No. 63/684,297, filed Aug. 16, 2024; U.S. Provisional Application No. 63/700,731, filed Sep. 29, 2024; and U.S. Provisional Application No. 63/700,733, filed Sep. 29, 2024.

TECHNICAL FIELD

The present invention relates to apparatus and methods for dispensing liquefied gas electrolyte mixtures, and more particularly to systems for maintaining constant composition of a multi-component liquefied electrolyte during dispensing.

BACKGROUND

When dispensing the liquid phase of a multi-component liquefied-gas mixture from a container, the liquid volume decreases, increasing the vapor headspace. According to Raoult's law, the vapor phase is enriched in higher vapor pressure components compared to the liquid phase. As liquid evaporates to fill the expanding headspace, the liquid becomes depleted in volatile components, altering its composition and reducing overall vapor pressure. This compositional drift can impair performance in applications requiring consistent properties, such as refrigeration systems using hydrofluorocarbon (HFC) blends or lithium-ion batteries employing liquefied gas electrolytes (e.g., mixtures of difluoromethane and lithium salts).

Conventional approaches include using constant-pressure cylinders (CPCs) with movable pistons or membranes to eliminate headspace, but CPCs are size-limited and not scalable for large volumes. Another method limits dispensing to a fraction of the container's capacity to minimize change, but this wastes material and increases costs. There remains a need for scalable systems that maintain constant liquid composition throughout dispensing without significant waste or size constraints.

SUMMARY

In one aspect, an apparatus includes: (i) a first pressure-rated container holding a liquid phase of a multi-component liquefied-gas mixture and a vapor headspace; (ii) a second container that holds vapor of substantially the same mixture as the vapor headspace of the first container; (iii) a fluid conduit coupling the containers; (iv) at least one flow-control element; (v) at least one sensor configured to measure a headspace condition of the first container; and (vi) a controller configured to transfer vapor from the second container to the first during liquid dispense so as to maintain a temperature-normalized headspace pressure (and therefore liquid-phase composition) within a selected tolerance band (e.g., ±10% and preferably ±2% relative for each component).

Transfer can be driven by heating the second container, by a constant-pressure mechanism, by a pump with or without an orifice, or by cycling an intermediate CPC through a 3-way valve. Embodiments are compatible with container volumes from laboratory scale to ≥500 L industrial scale.

The present invention provides apparatus and methods for maintaining constant composition of a multi-component liquefied-gas mixture during dispensing by transferring vapor from a second container to compensate for evaporation in a first container. In preferred embodiments, the mixture comprises components with boiling points below 293.15 K (e.g., HFCs for refrigerants or battery electrolytes). The first container holds both liquid and vapor phases, while the second contains primarily vapor, with both in fluid communication.

These systems enable full utilization of the source mixture with preferably less than 10% compositional variation, scalable to greater than 100 L volumes. Materials include stainless steel or coated alloys for corrosion resistance. Sensors provide feedback for automated control.

Additional aspects, alternatives, and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define, or otherwise establish the scope of legal protection.

BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

DETAILED DESCRIPTION OF THE INVENTION

Figure 1:
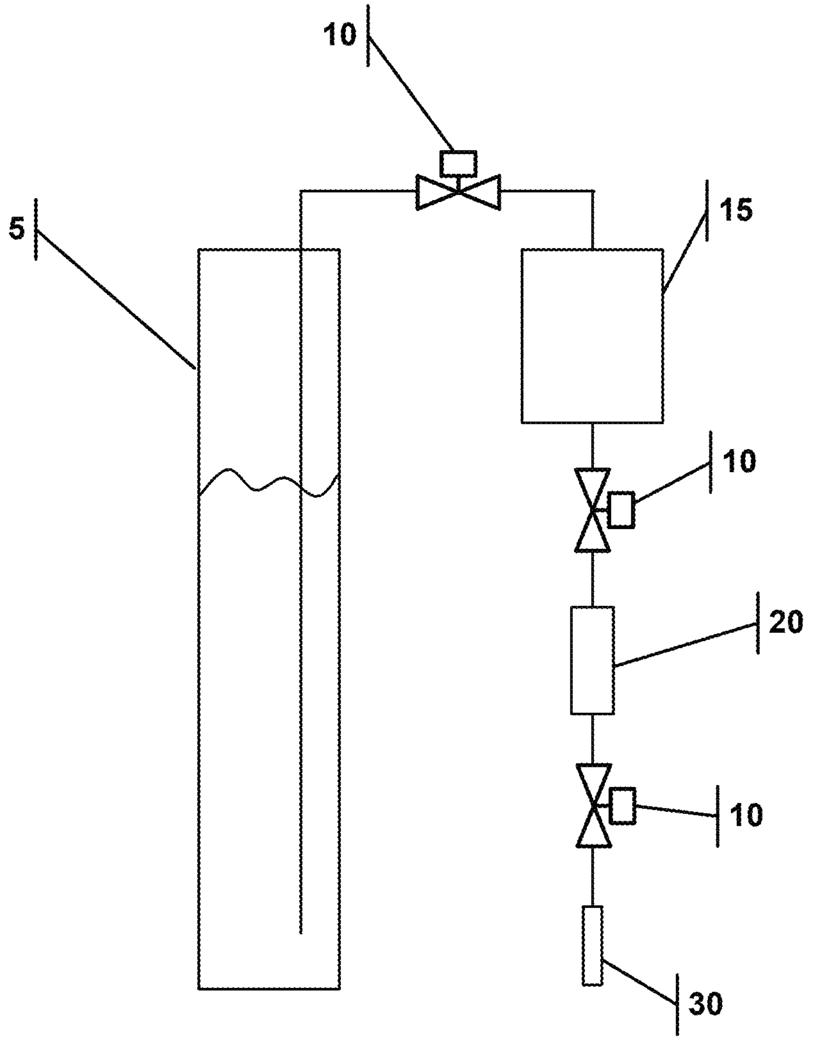
FIG. 1 schematically illustrates a conventional single-container dispense without composition control.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth to provide a thorough understanding of the present invention. Example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship, or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

The following list of example features corresponds with the attached figures and is provided for ease of reference, where like reference numerals designate corresponding features throughout the specification and figures:

First Container: 5
Valves: 10
3-Way Valve: 10.5
Bypass Valve: 11
Transfer Valve: 12
Buffer Tank: 15
Loading Volume: 20
Cell: 30
Second Container: 35
Multiple Second Containers: 35.1, 35.2, **35.*x***
Fluid Mixture: 40
Fluid Components: 40.1, 40.2, **40.*x***
Heater: 45
PID Controller: 50
Pressure Transducer: 55
Processor: 56
Fluid-transfer Mechanism: 57
Constant-pressure Container: 60
Piston: 61
CPC Valve: 62
Inert Gas: 63
Pump: 75
Orifice: 80

As used herein, the following terms have the meanings set forth below, unless the context dictates otherwise.

Liquefied gas: A substance that is gaseous at 293.15 K and 100 kPa and that is present as a liquid under the operating conditions of the apparatus.

Liquefied-gas mixture: A multi-component solution where at least one component has a boiling point below 293.15 K at 1 atm, maintained in liquid form under elevated pressure (e.g., 1-10000 kPa) or reduced temperature. Examples include refrigerant blends like R-410A (a 50/50 mol % mixture of difluoromethane (HFC-32) and pentafluoroethane (HFC-125)) or battery electrolytes comprising liquefied gases such as fluoromethane with lithium salts dissolved therein.

Constant composition: A condition under which the molar fraction of each component of the liquid phase varies by no more than a specified tolerance (e.g., ±10% relative) over the course of dispense.

First container: The source container holding the liquid phase and a headspace during dispense.

Second container: A container holding vapor of substantially the same mixture as the vapor headspace of the first container, fluidly coupled to the first container to supply vapor.

Constant-pressure cylinder (CPC): A container with a movable membrane or piston separating the process fluid from a drive fluid.

Flow-control subsystem: Hardware that meters fluid transfer, such as valves, an orifice, a needle valve, a pump, or a CPC shuttle assembly.

Headspace: The vapor volume above the liquid phase in a container.

Vapor transfer: The controlled movement of vapor-phase mixture from the second container to the first to compensate for evaporative losses.

System Overview

A first container holds the liquid and a vapor headspace. A second container holds vapor of the mixture, initially set to be composition-matched to the first container's headspace (e.g., by evacuating the second container and admitting headspace vapor from the first container until equilibrium). A fluid conduit couples the containers. A sensor on, or fluidly coupled to, the first container monitors a headspace condition. A controller actuates the flow-control subsystem to transfer vapor from the second container to the first to offset selective evaporation caused by liquid withdrawal.

In a closed system containing a multi-component liquefied-gas mixture, Raoult's law governs the partial pressures of components in the vapor phase, resulting in a vapor composition that is enriched in components with higher vapor pressures (more volatile) relative to the liquid phase. As liquid is dispensed from the container, the headspace volume increases, prompting evaporation from the liquid to re-establish equilibrium. This evaporation is selective, preferentially removing volatile components, which progressively depletes the liquid of these components and enriches it in less volatile ones. Consequently, the overall vapor pressure of the system decreases, and the liquid composition drifts, potentially by 10-20 mol % or more over full dispensing if unmitigated. Such changes can degrade performance in sensitive applications; for instance, in refrigeration, altered refrigerant blends may reduce cooling efficiency or cause system incompatibilities, while in lithium-ion batteries, electrolyte composition shifts can impair ionic conductivity, cycle life, or safety.

The present invention addresses these limitations by employing a dual-container system where a second container is connected to a first container and vapor in the second container is composition-matched to the headspace vapor in a first container. The vapor from the second container is actively or passively transferred to the first container, maintaining chemical equilibrium and constant chemical composition in the liquid phase of the first container. Preferred embodiments utilize two containers of similar size (e.g., volumes within 20% of each other, ranging from 10-500 L or larger for industrial scales) constructed from corrosion-resistant materials such as 316L stainless steel, Hastelloy, or polymer-lined alloys, rated for pressures up to 10000 kPa or more. The first container 5 may be prepared with a fluid of predetermined composition. The second container 35 may be evacuated to less than 1 kPa (absolute). The containers are connected via fluid conduits (e.g., ¼ to 1 inch diameter stainless steel tubing) and may be equipped with isolation valves 10 to control flow and prevent backflow. The second container 35 may be filled with the headspace vapor from the first container 5 by opening the isolation valve 10. The first container 5 may be prepared with a fluid composition rich in liquefied gas components to accommodate the transfer of vapor to fill the second container 35. After the transfer of vapor from first container 5 to second container 35, the first container 5 may have a liquid composition that is within 1% of the target liquid composition, and the second container 35 may have a vapor composition that is within 1% of the target vapor composition in the headspace of the first container 5. Pressure and temperature are monitored using sensors 55 (e.g., piezoelectric pressure transducers with ±10 kPa accuracy and thermocouples with ±0.1° C. accuracy) mounted on the first container or in the connecting lines. Automation is facilitated by programmable logic controllers (PLCs) or microcontrollers that adjust transfer based on real-time data to maintain a setpoint pressure (e.g., initial equilibrium pressure ±2%).

Embodiments

FIG. 1 illustrates a conventional dispensing system without composition maintenance. In this setup, the multi-component liquefied-gas mixture is stored in a single first container 5, which holds both liquid and vapor phases. Liquid is dispensed through a series of valves 10, optionally passing through a buffer tank 15 for pressure stabilization, a loading volume 20 for metered dosing, and ultimately to an end-use cell 30, such as an electrochemical device, battery cell, or refrigeration circuit. As dispensing proceeds, evaporation into the expanding headspace causes the aforementioned compositional drift. This approach often requires limiting dispense to 50-80% of the container's capacity to keep changes within acceptable tolerances (e.g., <10%), leading to material waste and increased operational costs.

The electrochemical device or battery cell may comprise the ionically conducting liquefied gas electrolyte comprising a mixture of one or more solid or liquid salts, a solution of one or more liquefied gas solvents, and one or more additives, wherein the liquefied gas solvent comprises at least a first component that has a vapor pressure above 100 kPa at a room temperature of 293.15K and the device is housed in an enclosure that allows the ionically conducting electrolyte to maintain a pressurized condition higher than 100 kPa at 293.15K such that the electrolyte is at least partially in a liquid phase within the cell housing.

In some embodiments, the liquefied gas electrolyte may comprise in part of dimethyl ether, methyl ethyl ether, fluoromethane, difluoromethane, trifluoromethane, fluoroethane, tetrafluoroethane, pentafluoroethane, 1,1-difluoroethane, 1,2-difluoroethane, 1,1,1-trifluoroethane, 1,1,2-trifluoroethane, 1,1,1,2-tetrafluoroethane, 1,1,2,2-tetrafluoroethane, pentafluoroethane, chloromethane, chloroethane, thionyl fluoride, thionyl chloride fluoride, phosphoryl fluoride, phosphoryl chloride fluoride, sulfuryl fluoride, sulfuryl chloride fluoride, 1-fluoropropane, 2-fluoropropane, 1,1-difluoropropane, 1,2-difluoropropane, 2,2-difluoropropane, 1,1,1-trifluoropropane, 1,1,2-trifluoropropane, 1,2,2-trifluoropropane, fluoroethene, cis-1,2-difluoroethene, 1,1-difluoroethene, 1-fluoropropene, propene, chlorine, chloromethane, bromine, iodine, ammonia, methyl amine, dimethyl amine, trimethyl amine, molecular oxygen, molecular nitrogen, carbon monoxide, carbon dioxide, sulfur dioxide, methyl vinyl ether, nitrous oxide, nitrogen dioxide, nitrogen oxide, carbon disulfide, hydrogen fluoride, hydrogen chloride, methane, ethane, propane, n-butane, isobutane, cyclopropane, ethene, propene, butene, cyclobutene, acetylene, 3,3,3-trifluoropropene, 2,3,3,3-tetrafluoropropene, trans-1,3,3,3-tetrafluoropropene, trans-1,1,1,4,4,4-hexafluoro-2-butene, cis-1,1,1,4,4,4-hexafluoro-2-butene, 1,1-difluoroethene, 1,2-difluoroethene, 1,1-dichloroethene, vinyl chloride, vinyl fluoride, hexafluoropropene, hexafluorobutadiene, trichloroethene, dichloroethene, chlorofluoroethene, (Z)-1-chloro-2,3,3,3-tetrafluoropropene, trans-1-chloro-3,3,3-trifluoropropene, 3,3,4,4,4-pentafluoro-1-butene, hydrofluoroolefins (HFOs), hydrochloroolefins (HCOs), hydrochlorofluoroolefins (HCFOs), perfluoroolefins (PFOs), or perchloroolefins (PCOs), perfluoroolefins, methane, ethane, propane, n-butane, iso-butane, cyclopropane, cyclopropane, ethene, propene, butene, cyclobutane, cyclobutene, acetylene, pentane, hexane, heptane, octane, cyclopentane, cyclohexane, cycloheptane, cyclooctane, isomers thereof, or a combination thereof.

In some embodiments, lithium-, sodium-, zinc-, calcium-, magnesium-, aluminum-, or titanium-based salts are used. Further, electrolyte or solvent solution containing one or more liquefied gas solvents may be combined with one or more salts, including one or more of lithium bis(trifluoromethanesulfonyl)imide (LiTFSI), lithium hexafluorophosphate ($LiPF_6$), lithium perchlorate ($LiClO_4$), lithium hexafluoroarsenate ($LiAsF_6$), lithium tetrachloroaluminate ($LiAlCl_4$), lithium tetragaliumaluminate, lithium bis(oxalato) borate (LiBOB), lithium hexafluorostannate ($LiSnF_4$), lithium difluoro (oxalato) borate (LiDFOB), lithium bis (fluorosulfonyl)imide (LiFSI), lithium aluminum fluoride ($LiAlF_3$), lithium nitrate ($LiNO_3$), lithium trifluoromethanesulfonate, lithium tetrafluoroborate ($LiBF_4$), lithium difluorophosphate, lithium tetrafluoro(oxalato)phosphate, lithium difluorobis(oxalato)phosphate, lithium borate, lithium oxalate, lithium thiocyanate, lithium tetrachlorogallate, lithium chloride, lithium bromide, lithium iodide, lithium carbonate, lithium fluoride, lithium oxide, lithium hydroxide, lithium nitride, lithium super oxide, lithium azide, lithium deltate, dilithium squarate, lithium croconate dihydrate, dilithium rhodizonate, dilithium ketomalonate, lithium diketosuccinate or any corresponding salts with a positively charged sodium or magnesium cation substituted for the lithium cation, or any combinations thereof. Further useful salts include those with positively charged cations such as tetramethylammonium, tetraethylammonium, tetrapropylammonium, tetrabutylammonium, triethylmethylammonium, spiro-(1,1')-bipyrrolidinium, 1,1-dimethylpyrrolidinium, and 1,1-diethylpyrrolidinium, N,N-diethyl-N-methyl-N(2-methoxyethyl) ammonium, N,N-Diethyl-N-methyl-N-propylammonium, N,N-dimethyl-N-ethyl-N-(3-methoxypropyl) ammonium, N,N-Dimethyl-N-ethyl-N-benzylAmmonium, N,N-Dimethyl-N-ethyl-N-phenylethylammonium, N-Ethyl-N,N-dimethyl-N-(2-methoxyethyl) ammonium, N-Tributyl-N-methylammonium, N-Trimethyl-N-hexylammonium, N-Trimethyl-N-butylammonium, N-Trimethyl-N-propylammonium, 1,3-Dimethylimidazolium, 1-(4-Sulfobutyl)-3-methylimidazolium, 1-Allyl-3H-imidazolium, 1-Butyl-3-methylimidazolium, 1-Ethyl-3-methylimidazolium, 1-Hexyl-3-methylimidazolium, 1-Octyl-3-methylimidazolium, 3-Methyl-1-propylimidazolium, H-3-Methylimidazolium, Trihexyl(tetradecyl)phosphonium, N-Butyl-N-methylpiperidinium, N-Propyl-N-methylpiperidinium, 1-Butyl-1-Methylpyrrolidinium, 1-Methyl-1-(2-methoxyethyl) pyrrolidinium, 1-Methyl-1-(3-methoxypropyl) pyrrolidinium, 1-Methyl-1-octylpyrrolidinium, 1-Methyl-1-pentylpyrrolidinium, or N-methylpyrrolidinium paired with negatively charged anions such as acetate, bis(fluorosulfonyl)imide, bis(oxalato) borate, bis(trifluoromethanesulfonyl)imide, bromide, chloride, dicyanamide, diethyl phosphate, hexafluorophosphate, hydrogen sulfate, iodide, methanesulfonate, methyl-phosphonate, tetrachloroaluminate, tetrafluoroborate, and trifluoromethanesulfonate. Alternative or additional embodiments described herein provide an electrolyte composition comprising one or more of the features of the foregoing description or of any description elsewhere herein.

In some embodiments the liquefied gas electrolyte may comprise an additive such as a non-cyclic carbonate, cyclic carbonate, ether, cyclic-ether, nitrile, or an organophosphate containing compound. These additives may include dimethyl carbonate, ethyl methyl carbonate, propyl methyl carbonate, butyl methyl carbonate, diethyl carbonate, propyl ethyl carbonate, butyl ethyl carbonate, dipropyl carbonate, propyl butyl carbonate, dibutyl carbonate, fluoromethyl methyl carbonate, difluoromethyl methyl carbonate, trifluoromethyl methyl carbonate, bis(fluoromethyl) carbonate, bis(difluoromethyl) carbonate, bis(trifluoromethyl) carbonate, fluoromethyl ethyl carbonate, difluoromethyl ethyl carbonate, trifluoromethyl ethyl carbonate, fluoroethyl ethyl carbonate, difluoroethyl ethyl carbonate, trifluoroethyl ethyl carbonate, tetrafluoroethyl ethyl carbonate, pentafluoroethyl ethyl carbonate, hexafluoroethyl ethyl carbonate, bis(fluoroethyl) carbonate, bis(difluoroethyl) carbonate, bis(trifluoroethyl) carbonate, bis(tetrafluoroethyl) carbonate, bis(pentafluoroethyl) carbonate, bis(hexafluoroethyl) carbonate, vinyl carbonate, ethylene carbonate, propylene carbonate, 1,2-butylene carbonate, trans-butylene carbonate, fluoroethylene carbonate, difluoroethylene carbonate, trifluoroethylene carbonate, tetrafluoroethylene carbonate, chloroethylene carbonate, dichloroethylene carbonate, trichloroethylene carbonate, tetrachloroethylene carbonate, fluoromethyl ethylene carbonate, difluoromethyl ethylene carbonate, trifluoromethyl ethylene carbonate, bis(fluoromethyl)ethylene carbonate, bis(difluoromethyl)ethylene carbonate, bis (trifluoromethyl)ethylene carbonate, methyl propyl ether, methyl butyl ether, diethyl ether, ethyl propyl ether, ethyl butyl ether, dipropyl ether, propyl butyl ether, dibutyl ether, ethyl vinyl ether, divinyl ether, glyme, diglyme, triglyme, tetraglyme, 1,1,2,2-Tetrafluoro-3-(1,1,2,2-tetrafluoroethoxy)-propane, trifluoro(trifluoromethoxy)methane, perfluoroethyl ether, fluoromethyl methyl ether, difluoromethyl methyl ether, trifluoromethyl methyl ether, bis(fluoromethyl)ether, bis(difluoromethyl)ether, fluoroethyl methyl ether, difluoroethyl methyl ether, trifluoroethyl methyl ether, bis (fluoroethyl)ether, bis(difluoroethyl)ether, bis(trifluoroethyl)ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, methyl nanofluorobutyl ether, ethyl nanofluorobutyl ether, 2-fluoroethoxymethoxyethane, 2,2-difluoroethoxymethoxyethane, methoxy-2,2,2-trifluoroethoxyethane, ethoxy-2-fluoroethoxyethane, 2,2-difluoroethoxyethoxyethane, ethoxy-2,2,2-trifluoroethoxyethane, bis(trifluoro)methyl ether, dimethylether, methyl ethyl ether, methyl vinyl ether, perfluoromethyl-vinylether, propylene oxide, tetrahydrofuran, tetrahydropyran, furan, 12-crown-4, 12-crown-5, 18-crown-6, 2-Methyltetrahydrofuran, 1,3-Dioxolane, 1,4-dioxolane, 2-methyloxolane, (1,2-propylene oxide), ethylene oxide, octafluorotetrahydrofuran, acetonitrile, propionitrile, butanenitrile, pentanenitrile, hexanenitrile, hexanedinitrile, pentanedinitrile, butanedinitrile, propanedinitrile, ethanedinitrile, isovaleronitrile, benzonitrile, phenylacetonitrile, cyanogen chloride, hydrogen cyanide, ethanedinitrile, trimethylphosphate, triethylphosphate, isomers thereof, and any combination thereof.

In an exemplary electrochemical device using a liquefied gas electrolyte composed of one or more liquefied gas components with any combination of one or more liquid components, one or more solid components, or one or more salt components, the electrodes are composed of any combination of two electrodes of intercalation type such as graphite, carbon, activated carbon, vanadium oxide, lithium titanate, titanium disulfide, molybdenum disulfide, lithium iron phosphate, lithium cobalt phosphate, lithium nickel phosphate, lithium cobalt oxide, lithium nickel manganese oxide, lithium nickel manganese cobalt oxide, lithium nickel cobalt aluminum oxide, carbon, or chemical reaction electrode such as with chemicals of sulfur, oxygen, carbon dioxide, nitrogen, nitrous oxide, sulfur dioxide, thionyl fluoride, thionyl chloride fluoride, sulfuryl fluoride, sulfuryl chloride fluoride, or electrostatic electrode using a high surface area electrically conducting material such as activated carbon, carbon black, carbon nanotubes, graphene, or of a metallic electrode with lithium, sodium, magnesium, tin, aluminum, calcium, titanium zinc metal or metal alloy including lithium, sodium, tin, magnesium, aluminum, calcium, titanium, zinc, or any combination thereof. These components may be combined with various binder polymer components, including polyvinylidene fluoride, carboxymethyl cellulose, styrene-butadiene rubber, or polytetrafluoroethylene to maintain structural integrity of the electrode.

In an exemplary example, the electrochemical device is partly comprised of a positive electrode, a negative electrode, electrically insulating separator, and an ionically conductive electrolyte. The positive and negative electrodes are comprised in part an electrochemically active material, an electrically conductive material, and a binder which is often coated onto a metal foil which acts as metallic substrate. The coated electrodes and separator assembly are often held together by tape materials and then wetted by an ionically conductive electrolyte material.

Figure 2:
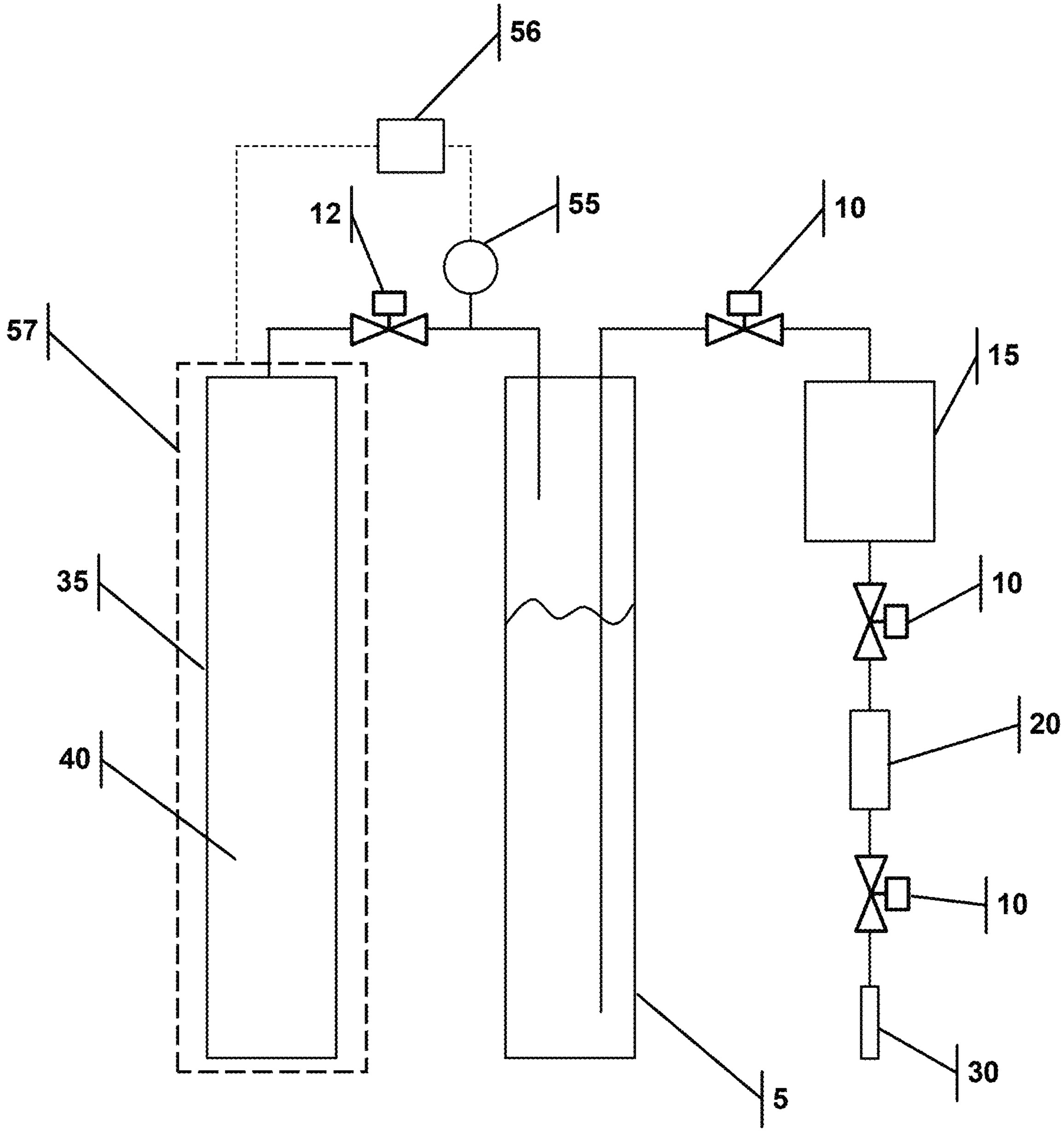
FIG. 2 illustrates a pressure-feedback embodiment with a generic fluid-transfer mechanism.

In the embodiment of FIG. 2, a second container 35 may be fluidly connected to the first container 5 through a transfer valve 12. The second container 35 may contain a fluid mixture 40 to transfer to first container 5 as the first container 5 is dispensed. The first container 5 may have a pressure sensor 55 in fluid connection with the headspace to monitor the vapor pressure of the liquid in the first container 5. The pressure sensor 55 may be connected to a processor 56 which may compare the pressure reading with a predetermined target pressure. The processor 56 may connect to a fluid-transfer mechanism 57 configured to transfer fluid mixture 40 from the second container 35 to the first container 5. The processor 56 may signal the fluid-transfer mechanism 57 to flow fluid to the first container 5 if the pressure in the first container 5 is lower than the target pressure, or the processor 56 may signal the fluid-transfer mechanism 57 to stop fluid transfer to the first container 5 if the pressure in the first container 5 is equal to or greater than the target pressure.

FIG. 2 is a generic embodiment of this apparatus that may have multiple permutations as described in subsequent embodiments. In some embodiments, fluid mixture 40 may include one or more fluids all in a single phase (e.g., either entirely vapor phase or entirely liquid phase) within second container 35.

Figure 3:
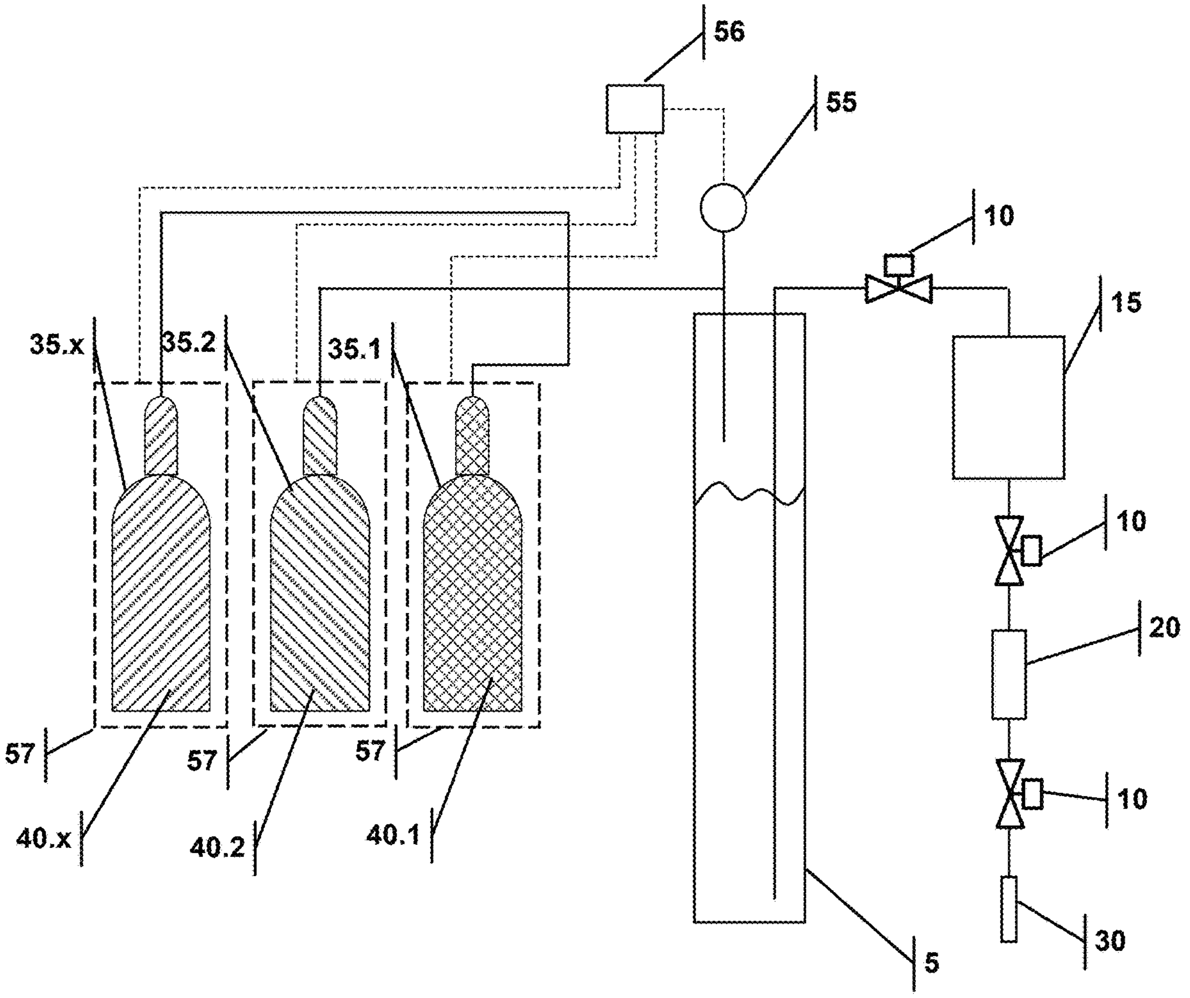
FIG. 3 illustrates an embodiment using multiple component containers metered to the first container.

In the embodiment of FIG. 3, the second container 35 containing fluid mixture 40 is replaced with containers (35.1, 35.2, 35.*x*) of fluids (40.1, 40.2, 40.*x*). The fluid components 40.1, 40.2, 40.*x* may be individual components in the fluid mixture in first container 5. The containers 35.1, 35.2, 35.*x* may have a fluid-transfer mechanism 57 connected to a processor 56. The processor 56 may utilize a program to transfer fluid components 40.1, 40.2, 40.*x* in a correct proportion to maintain a target composition of the liquid in first container 5 as the liquid is dispensed. This embodiment may provide a stable composition, but may not be readily implemented in high throughput manufacturing due to the complexity of the fluid delivery systems.

Figure 4:
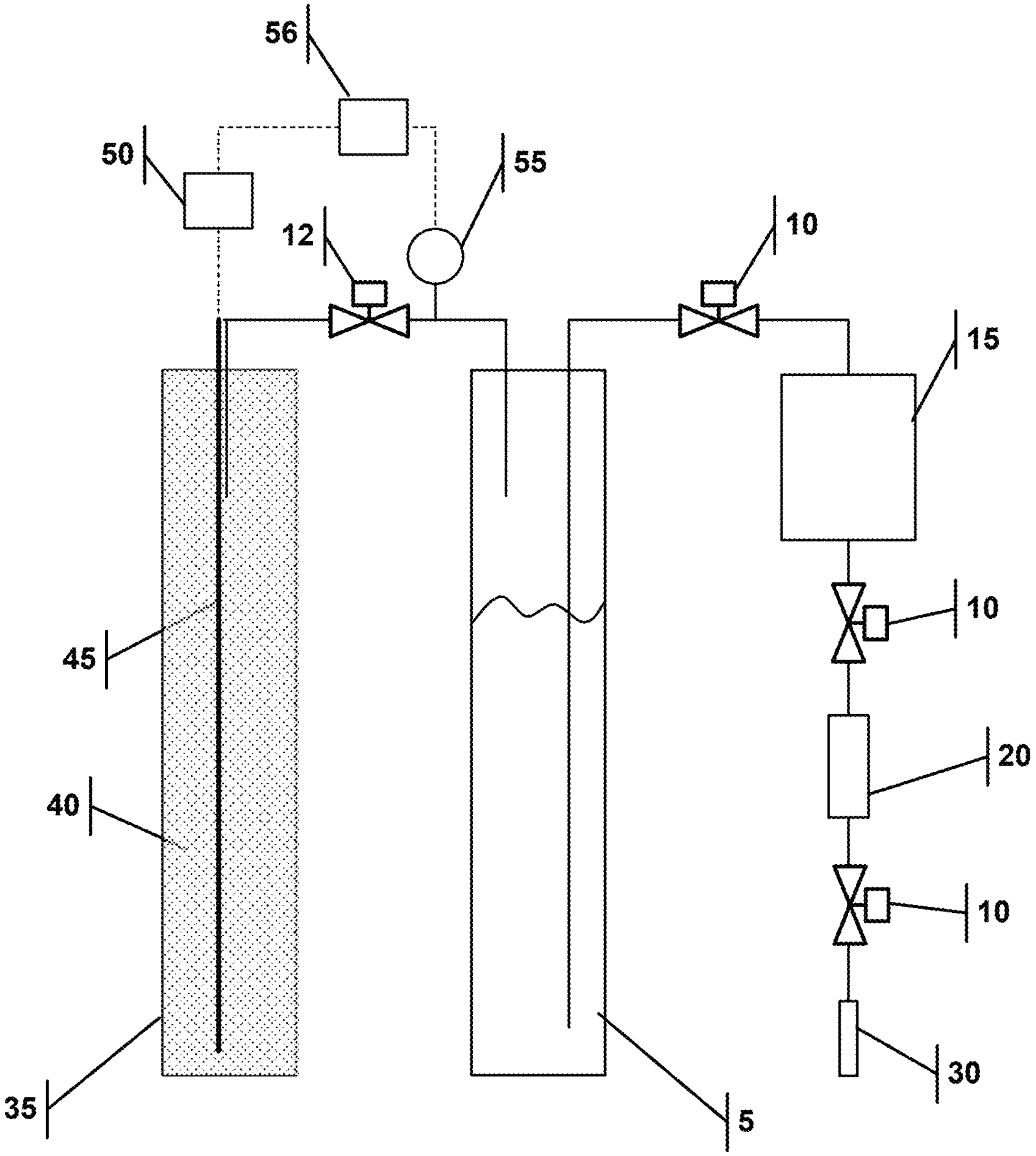
FIG. 4 illustrates an embodiment in which a heater on the second container drives vapor transfer.

Heater-Driven Transfer (FIG. 4). In the embodiment of FIG. 4, the fluid-transfer mechanism may be a thermal control device. A heater 45, such as an electric band heater or immersion heater with power output (scalable with container size), is integrated within the second container 35 to directly warm the fluid. In preferred embodiments of FIG. 4, the fluid mixture 40 is a vapor mixture. The heater 45 may elevate the vapor temperature by 5° C. or as high as 200° C. relative to the first container 5. Those of ordinary skill in the art will recognize that the increased vapor temperature reduces the vapor density in the second container 35, creating a pressure differential that forces fluid mixture 40 through the fluid connection into the headspace of the first container 5. Thus, to dispense as much liquid in the first container as possible, the second container should be at a substantially elevated temperature to reduce the vapor density and allow vapor to be transferred to first container 5. The transfer rate can be modulated by the heater power and conduit restrictions. A processor 56 receives input from pressure sensor 55 and sends a signal to PID controller 50 to adjust the heater 45 to maintain constant-pressure, ensuring vapor addition matches the evaporation rate. For example, in a 100 L system dispensing at 1 L/min, the controller might cycle the heater to deliver 0.1-10 L/min vapor equivalent. This embodiment may allow the first container 5 and second container 35 to be continuously open to each other which may provide improved pressure and liquid composition stability in first container 5. However, this embodiment requires fast temperature regulation and exposes the fluid in second container 35 to high temperatures which may restrict use with some fluids. Typical temperature offsets are 5-60° C.; larger offsets (up to 200° C. depending on compatibility) can be used for rapid transfer. Temperature offsets may increase corresponding to the cumulative percentage of liquid removed from the first container 5.

Figure 5:
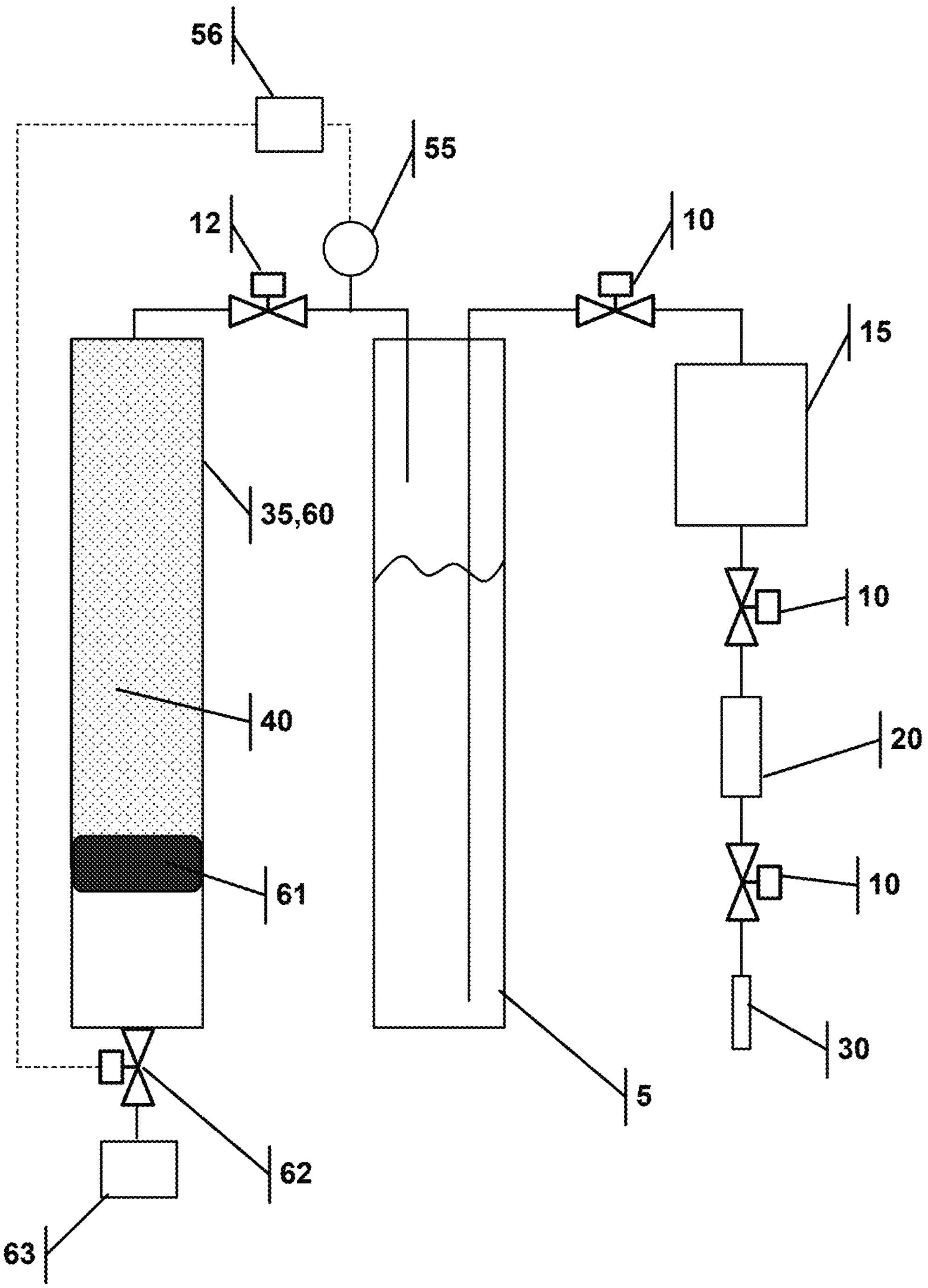
FIG. 5 illustrates an embodiment where the second container is a constant-pressure cylinder (CPC).

Constant-Pressure Second Container (FIG. 5). FIG. 5 depicts an embodiment where the second container functions as a constant-pressure cylinder (CPC) 60, typically piston- or bladder-type, with an expandable volume chamber that matches the anticipated dispense volume (e.g., up to 100% of the first container's liquid capacity). As liquid is dispensed from the first container 5, the resulting pressure drop triggers the CPC to contract (e.g., via spring-loaded piston or pressurized gas backing), forcing fluid mixture 40 through the connection to replenish the headspace. An inert gas 63 is used to set the CPC's backpressure on piston 61 to the mixture's equilibrium vapor pressure (e.g., 1000-2000 kPa for HFC blends) at the operating temperature. Processor 56 may be connected to sensor 55 and valve 62 to create a pressure-feedback loop, ensuring backpressure on piston 61, and headspace pressure in first container 5 remain consistent with their initial setup pressures as liquid is dispensed from first container 5. Transfer valve 12 may be closed to isolate second container 35 from first container 5 during the setup process. Transfer valve 12 may be open continuously during the liquid depletion from first container 5 so that the CPC 60 may continuously transfer fluid as needed. This embodiment may allow full utilization of the vapor in the second container 35 so that the first container 5 may be fully dispensed of liquid and maintain stable liquid composition. However, CPC size limitations (typically less than 25 L) may necessitate multiple units in parallel for larger scales. Multiple CPCs can be banked in parallel for larger volumes. Fluid mixture 40 may be entirely vapor phase or entirely liquid phase. In embodiments where fluid mixture 40 is liquid, the second container 35 may be prepared with a liquid composition equivalent to the headspace vapor composition of the first container 5. The second container 35 may be filled prior to connection with first container 5.

Figure 6:
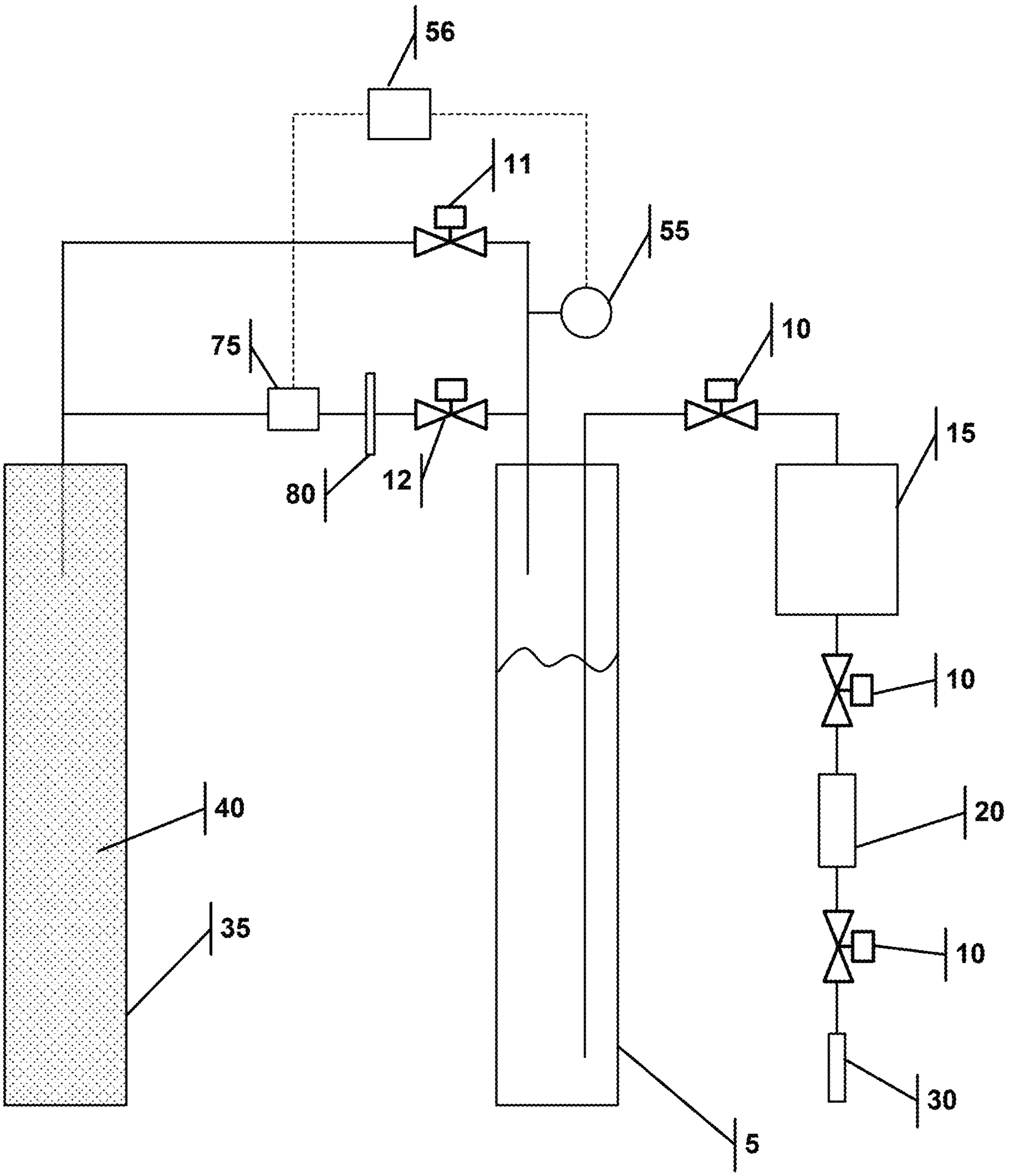
FIG. 6 illustrates an embodiment using a pump and, optionally, an orifice.

Pump-Driven Transfer (FIG. 6). In FIG. 6, active mechanical transfer is employed using a pump 75, such as a diaphragm or peristaltic pump rated for gas handling (0.1-100 L/min flow). The pump draws vapor from the second container 35 and pushes it to the first container 5, with flow regulated by an orifice 80 (e.g., fixed 0.02-1 mm diameter for fine or coarse control). The pump may draw vapor from the second container 35 until the second container pressure is below 100 kPa, preferably below 10 kPa, to ensure maximum utilization of the liquid in the first container 5. Transfer valve 12 may provide isolation of pump 75 from first container 5. Pump 75 may pressurize the fluid mixture 40 equal to or slightly above the vapor pressure in first container 5 to prevent back-streaming when transfer valve 12 opens to transfer fluid to first container 5. Embodiments may include bypass valve 11. Bypass valve 11 may be utilized for setup of second container 35 when a first container 5 is installed; such that bypass valve 11 is opened to allow headspace vapor from first container 5 to flow to the evacuated second container 35. Processor 56 may be connected to sensor 55 and pump 75 to create a pressure-feedback loop that modulates pump speed, ensuring fluid addition correlates with dispense rate (e.g., via flow meters on the liquid line). This setup may allow nearly full utilization of the vapor in second container 35, and is scalable to industrial sized containers (e.g., 500 L or larger).

Figure 7:
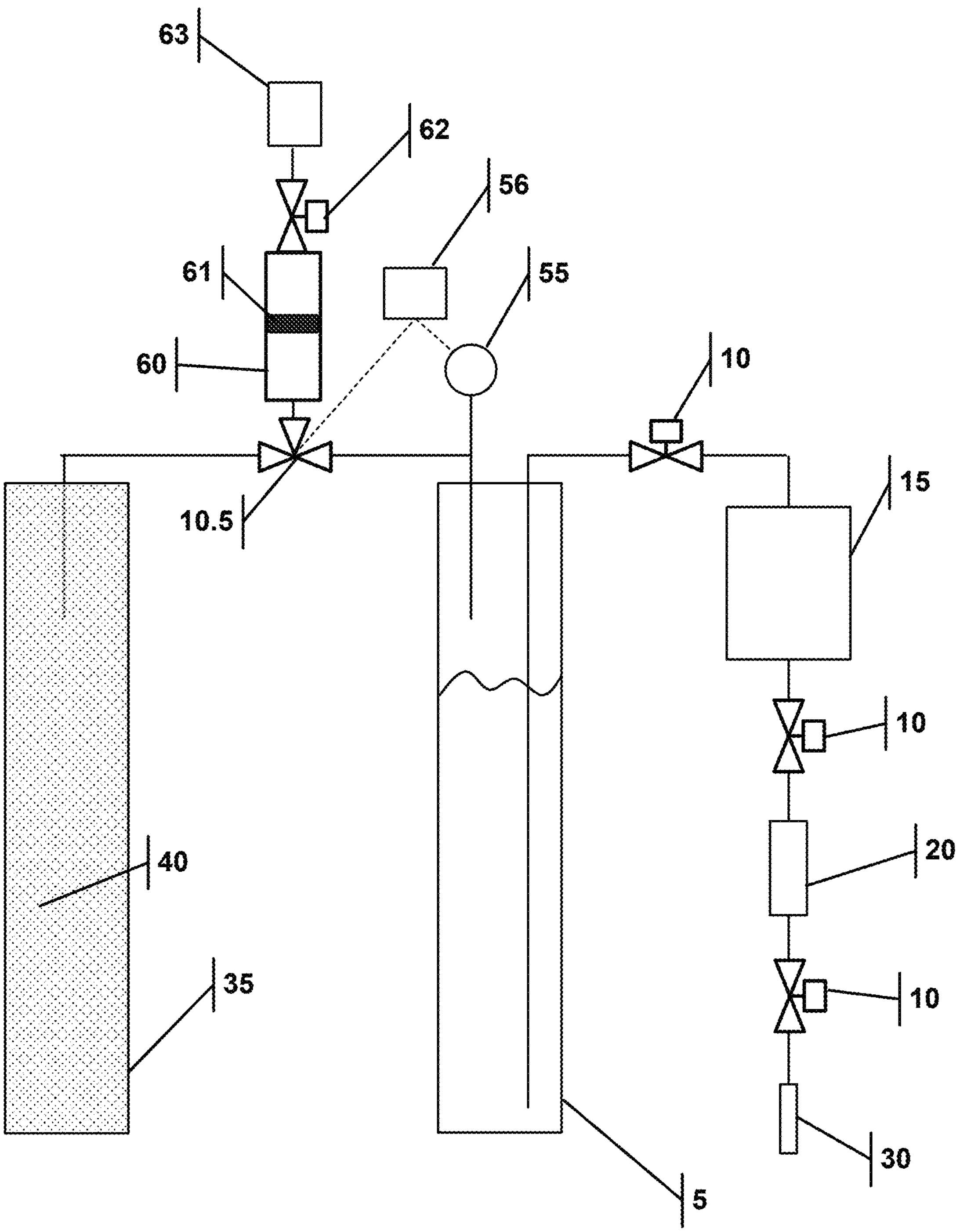
FIG. 7 illustrates an embodiment using a small intermediate CPC cycled via a 3-way valve.

Shuttle CPC (FIG. 7). FIG. 7 illustrates a batch-transfer embodiment using a small intermediate CPC 60 (0.1-25 L capacity) connected via a 3-way valve 10.5. The cycle begins with valve 10.5 open to the second container 35, allowing fluid mixture 40 to fill the CPC. Once filled, the valve switches to connect the CPC to the first container 5, where the CPC contracts to force vapor delivery. An inert gas 63 provides backpressure on piston 61 to regulate piston 61 position. Processor 56 may be connected to sensor 55 and valve 10.5 to create a pressure-feedback loop that actuates valve 10.5, ensuring CPC cycle rate correlates with liquid dispense rate in first container 5. Valve 10.5 actuation may be triggered by processor 56 when sensor 55 reads a predetermined pressure threshold (e.g., drop of 5 kPa initiates fill/discharge). This method decouples container sizes, enabling a compact CPC for large systems, and may be compatible with liquid dispense rates exceeding 20 L per minute from first container 5.

For continuous transfer (heater-, CPC-, or pump-driven), the second container volume preferably is 0.1-2× that of the first. Wetted materials can include 316L stainless steel, Hastelloy, aluminum alloys with protective coatings, or polymer-lined metals. Typical line sizes are ¼-1 in. Instruments include pressure transducers (±0.1-1% FS) and temperature sensors (±0.5 K).

Controls and Safety

A PLC or microcontroller runs a PID loop to hold the setpoint while dispensing. Recommended safeguards include over-pressure relief, rupture disks, and interlocks to close valves or stop pumps on fault conditions. Across embodiments, automation integrates sensors with control software (e.g., LabVIEW or PLC-based) for real-time adjustment. Safety features include pressure relief valves, rupture disks, and interlocks to halt dispensing on anomalies (e.g., overpressure >10% setpoint). Materials must resist corrosion from components like HF generated in HFC degradation; coatings such as PTFE or nickel plating are recommended. For cryogenic mixtures, insulation (e.g., vacuum jackets) minimizes external heat input.

COMPARATIVE EXAMPLES

Example 1 (Composition). A ternary liquefied-gas blend of fluoromethane (FM), 1,1-difluoroethane (DFE), and carbon dioxide (CO2) was dispensed from two otherwise identical containers: a control without composition control and a setup incorporating a CPC as the second container. Liquid samples collected at multiple remaining-volume fractions were vaporized and analyzed by GC/MS. Peak-area ratios FM/CO2 and DFE/CO2 remained substantially stable in the CPC setup, while increasing by ~30% and ~80%, respectively, in the control as the container emptied (see FIGS. 8A-8B).

Figure 8A:
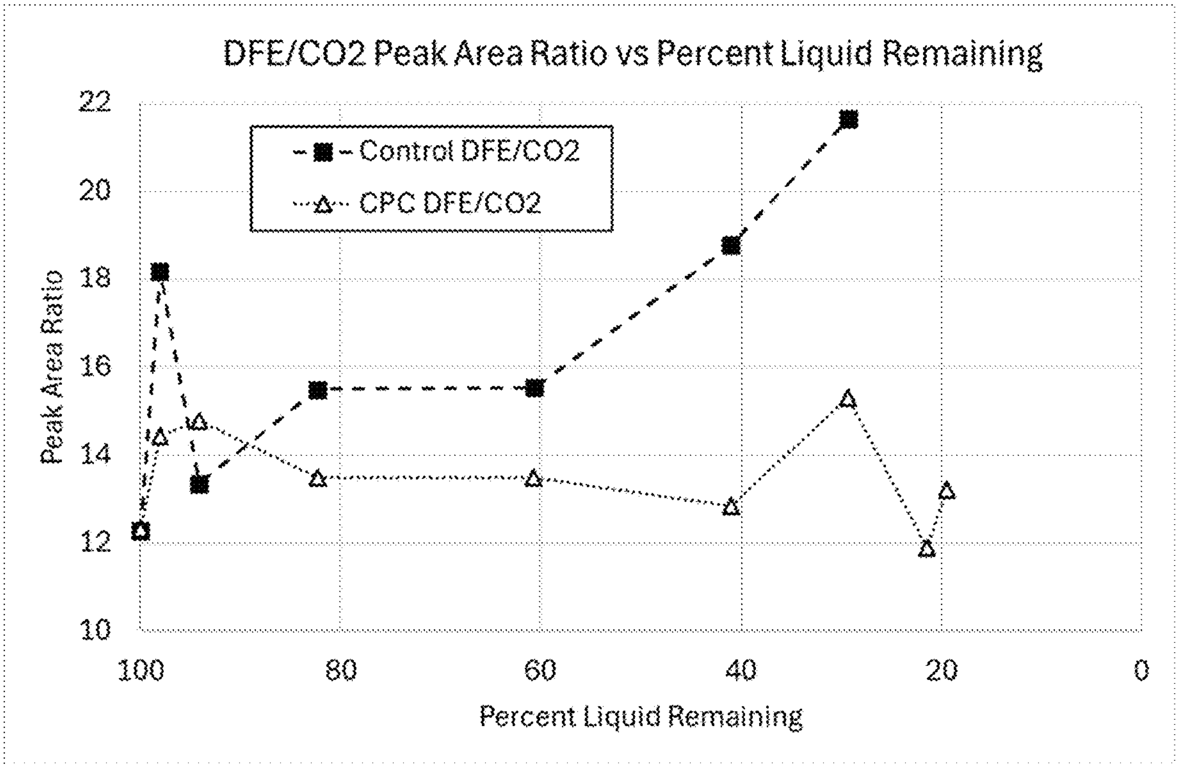
FIGS. 8A-8B provide GC/MS-based composition data comparing a CPC setup to a control.
Figure 8B:
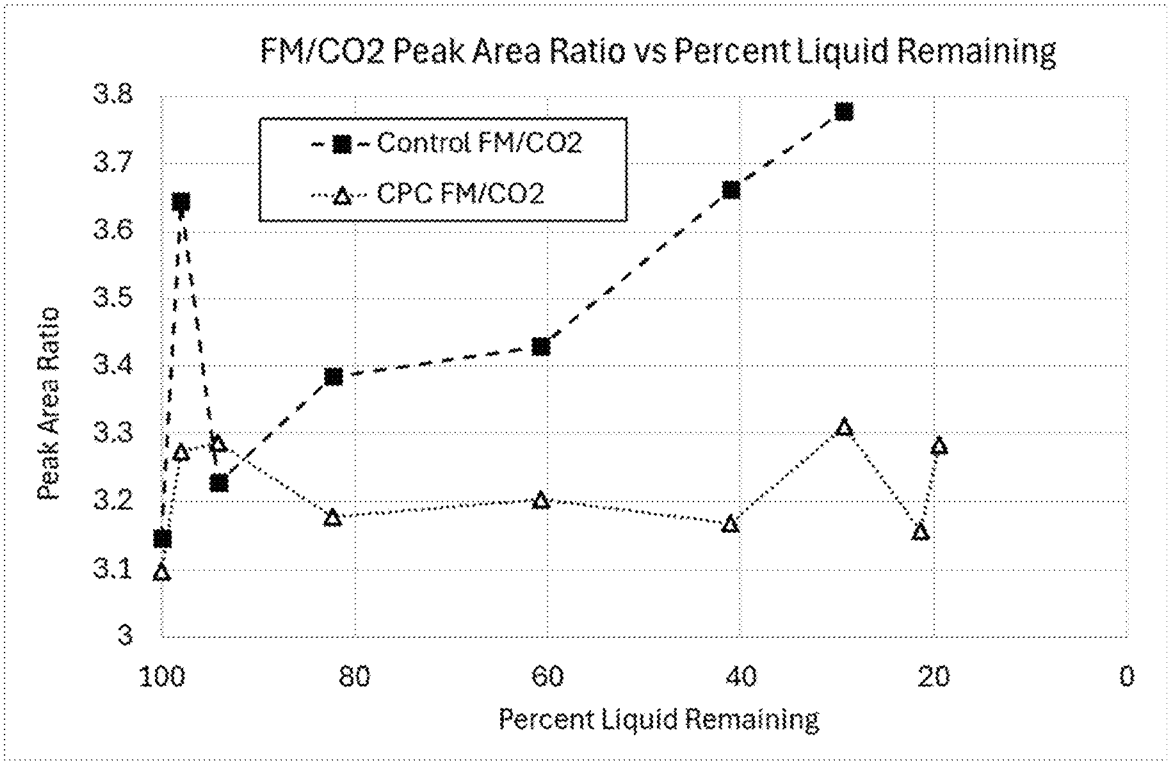

FIGS. 8A-8B shows gas chromatography mass spectrometry (GC/MS) based composition analysis of a ternary liquefied-gas blend composed of fluoromethane (FM), 1,1-difluoroethane (DFE), and carbon dioxide (CO2). Liquid phase samples were collected from a container as the liquid was incrementally dispensed from the container. Samples were collected from two setups; one that did not incorporate any composition control apparatus (Control), and one that incorporated a CPC, similar to the embodiment shown in FIG. 5. The liquid samples collected from each setup were vaporized into a larger vessel for injection and composition analysis in the GC/MS. The data show the relative GC/MS peak area ratios of FM to CO2 (FIG. 8A) and DFE to CO2 (FIG. 8B) with respect to the remaining liquid percentage of the liquefied-gas blend in the container. The data for the Control setup shows relative peak area ratios of FM and DFE increase approximately 30% and 80% with respect to CO2 as the liquid is removed from the container. The data for the CPC setup shows relative peak area ratios of FM and DFE that are more stable with respect to CO2 as the liquid is removed from the container. The difference between peak area ratios in the Control and CPC setups increases as the remaining liquid is reduced. The variability observed in the data may be associated with experimental or instrumental error involved in the sample processing.

Example 2 (Pressure). Headspace pressure recorded during dispense decreased steadily in the control and remained approximately constant in the CPC setup (see FIG. 9).

Figure 9:
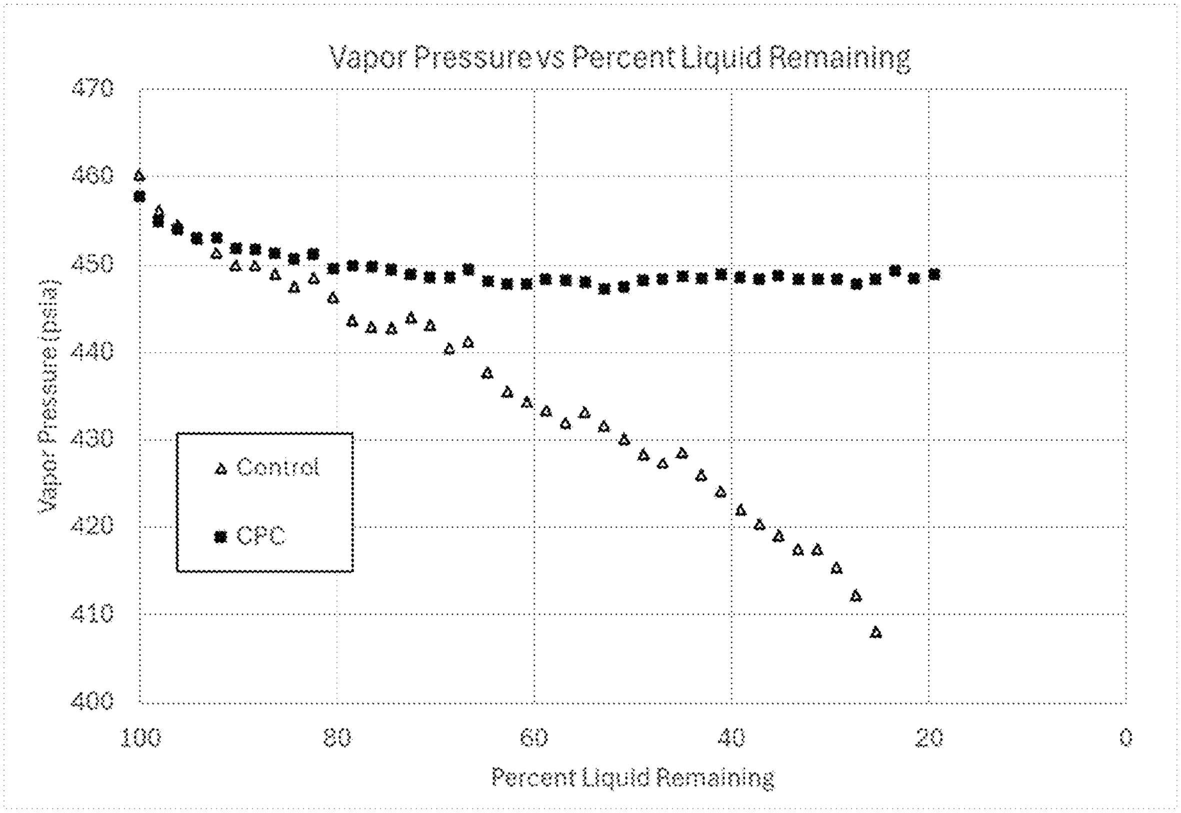
FIG. 9 shows headspace pressure versus remaining liquid for CPC and control setups.

FIG. 9 shows pressure sensor data for the same containers of liquefied-gas blend discussed in Example 1. The pressure sensors were setup to monitor the headspace of the containers. A larger quantity of pressure data points are presented relative to FIGS. 8A-8B because pressure data was more easily collected for each liquid dispense increment. The Control data show steady decrease in headspace pressure as the remaining liquid is reduced. The CPC data show steady headspace pressure as the remaining liquid is reduced.

Operation

The operation of the apparatus begins with the setup phase, where the first container is prepared with a target liquid composition of the multi-component liquefied-gas mixture. The second container is evacuated to establish a low-pressure environment, typically below 1 kPa (absolute), and then fluidly connected to the first container via a fluid conduit and appropriate valves. The headspaces of the two containers are communicated to charge the second container with vapor composition-matched to the first container's headspace, ensuring equilibrium is achieved; this may involve opening a bypass valve to facilitate initial vapor transfer. An optional calibration step can be performed to establish a correlation between the temperature-normalized headspace pressure and the liquid-phase composition of the mixture, utilizing reference mixtures and equilibrium pressure measurements at specified temperatures.

During the dispense phase, liquid is withdrawn from the first container and directed to a downstream process, such as a buffer tank, a metered loading volume, or an electrochemical-cell filling station, through a series of valves. As the liquid is dispensed, the vapor headspace in the first container expands, prompting selective evaporation of more volatile components to re-establish equilibrium, which would otherwise lead to compositional drift. To counteract this, the closed-loop control system is activated, wherein a sensor, such as a pressure transducer coupled to the headspace, continuously monitors the headspace condition. The controller, which may be a programmable logic controller (PLC) or microcontroller, processes the sensor data and actuates the flow-control subsystem—whether a heater, constant-pressure cylinder (CPC), pump, or three-way valve—to transfer vapor from the second container to the first container. This transfer is regulated to maintain the temperature-normalized headspace pressure within a predetermined tolerance band, such as ±10% relative for each component, and preferably ±2%, ensuring the liquid-phase composition remains stable throughout the dispense process.

The operation concludes with the termination phase, where all valves are closed to isolate the containers, and the final pressure and temperature readings are logged for record-keeping. The first container 5 is then isolated for storage or prepared for the next batch. The second container 35 may not need replacement if its contents have been depleted or evacuated. For systems requiring purge or inerting, the containers are isolated, evacuated, or backfilled with an inert gas, and a leak-check is performed to ensure integrity. A replacement first container 5 is then installed. Vapor communication is established by opening the appropriate valves between the containers, with sensor readings verified to confirm proper system status. The dispense process is initiated by opening outlet valves from the first container to downstream components, and the control loop is maintained by actuating the heater, pump, CPC, or valves as needed to sustain the headspace setpoint. This structured operation ensures efficient and consistent dispensing while minimizing compositional drift across a range of operating conditions.

Manufacture

The manufacturing process for the apparatus commences with the construction of the pressure vessels, where the first and second containers are fabricated using standard techniques such as welding, machining, or casting, employing materials like 316L stainless steel, Hastelloy, or polymer-lined alloys to ensure compatibility with the multi-component liquefied-gas mixture and to withstand pressures up to 10000 kPa or more. Surface treatments, such as PTFE or nickel coatings, are applied to enhance corrosion resistance and protect against degradation products like hydrogen fluoride that may form during operation. The integration of additional components follows, where off-the-shelf heaters, pumps, valves, and instrumentation are assembled into the selected embodiment, with custom fittings installed to connect sensors and control elements securely to the fluid conduit system. Calibration and acceptance testing are conducted using reference mixtures to empirically map the pressure-composition relationships, allowing for precise adjustment and validation of the system's performance across its intended operating range. The manufacturing process concludes with system purge or inerting procedures, if required, where containers are isolated, evacuated, or backfilled with an inert gas, followed by a thorough leak-check to ensure the integrity and safety of the assembled apparatus.

Implementation Guidance

Select a setpoint band corresponding to the desired composition tolerance using the calibration curve. For volatile/thermal-sensitive mixtures, prefer CPC or pump-driven embodiments over high-temperature heater operation. For very large containers, use the pump approach or use the shuttle-CPC approach.

For a given solution, a calibration curve can be established that maps headspace pressure (normalized to temperature) to liquid composition. During development, the curve may be generated by preparing reference mixtures and measuring equilibrium pressure at one or more temperatures. Sizing: The second container volume is preferably comparable (e.g., 0.1-2×) to the first container volume for continuous-flow embodiments (FIGS. 4 & 5). In the CPC shuttle embodiment (FIG. 7), the CPC volume may be a fraction of the container volumes (e.g., 0.01-20%) because the shuttle action can be repeated. Components: Suitable valves include needle, diaphragm, or ball valves rated for the operating pressure. The sensor (55) can be a combined pressure/temperature transducer; accuracy of ±1% full-scale (pressure) and ±0.5 K is generally adequate. The controller (50) can be a PID loop implemented in a PLC or microcontroller.

Relief devices and burst disks should be provided consistent with applicable codes. Materials and seals must be compatible with the liquefied gas solution and temperature range.

Variations

The features disclosed herein can be combined in any operable arrangement unless a specific incompatibility is noted. Dimensions and ranges are exemplary; all values include tolerances appropriate for the manufacturing process. Terms used in the claims should be construed as having their plain and ordinary meaning to a person of ordinary skill in the art unless explicitly defined herein.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art, and that the scope of the present invention is accordingly limited by nothing other than the appended claims.

The invention claimed is:

1. An apparatus for maintaining liquid-phase composition of a multi-component liquefied-gas mixture during dispensing, the mixture consisting of a plurality of chemical components, comprising:

- a first container containing a liquid phase of the mixture and a vapor headspace;
- a second container containing vapor of the mixture, wherein the vapor in the second container is composition-matched to the vapor headspace of the first container, the second container being distinct from a downstream container receiving the dispensed liquid phase;
- a fluid conduit fluidly coupling the second container to the headspace of the first container;
- at least one sensor configured to measure a headspace condition of the first container;
- a flow-control subsystem disposed in the conduit; and
- a controller operatively coupled to the sensor and the flow-control subsystem and configured to transfer vapor from the second container to the first container during liquid dispensing to maintain a temperature-normalized headspace pressure within a band that corresponds to a liquid-phase composition tolerance of ±10% relative to an initial molar fraction for each chemical component.

2. The apparatus of claim 1, wherein the second container includes a heater and the controller is configured to modulate heater power to drive the vapor transfer.

3. The apparatus of claim 1, wherein the second container is a constant-pressure cylinder (CPC) having a piston or bladder driven by an inert gas.

4. The apparatus of claim 3, further comprising a regulator configured to set a CPC back-pressure to an equilibrium vapor pressure of the mixture at an operating temperature.

5. The apparatus of claim 1, wherein the flow-control subsystem comprises a pump.

6. The apparatus of claim 5, further comprising an orifice to regulate vapor flow.

7. The apparatus of claim 1, further comprising a valve and an intermediate CPC configured to alternately fill from the second container and discharge to the first container.

8. The apparatus of claim 7, wherein a volume of the intermediate CPC is less than 20% of a volume of the first container.

9. The apparatus of claim 1, further comprising a bypass valve configured to initially charge the second container with headspace vapor from the first container.

10. The apparatus of claim 1, wherein a volume of the second container is 0.1-2 times a volume of the first container.

11. The apparatus of claim 1, wherein one or more components of the apparatus that are wetted by the mixture comprise stainless steel, Hastelloy, or polymer-lined metal compatible with the mixture.

12. The apparatus of claim 1, wherein the mixture comprises at least one component having a normal boiling point less than 293.15 K.

13. The apparatus of claim 1, wherein the containers are sized within 20% volume of each other and constructed of material rated for pressures up to 10000 kPa.

14. The apparatus of claim 1, wherein the sensor comprises a pressure transducer directly coupled to the headspace of the first container and a temperature sensor, and the controller is configured to normalize the headspace pressure to temperature.

15. The apparatus of claim 1, wherein the second container comprises a bank of containers metered in proportion to target component ratios of the mixture.

16. The apparatus of claim 1, wherein the controller is further configured to close the flow-control subsystem responsive to a fault or over-pressure condition.

17. A method of maintaining constant composition of a multi-component liquefied-gas mixture during dispensing, the mixture consisting of a plurality of chemical components, comprising:

providing a first container containing the liquid phase and a vapor headspace of the mixture;

providing a second container containing vapor of the mixture and fluidly coupling the second container to the headspace of the first container, wherein the vapor in the second container is composition-matched to the vapor headspace of the first container, the second container being distinct from a downstream container receiving the dispensed liquid phase;

equilibrating the second container with headspace vapor from the first container;

dispensing liquid from the first container to a downstream process; and based on a measured headspace condition of the first container, transferring vapor from the second container to the first container so as to hold a headspace pressure within a band that corresponds to a liquid-phase composition tolerance of ±10% relative to an initial molar fraction for each chemical component.

18. The method of claim 17, wherein transferring comprises heating the second container to drive vapor flow.

19. The method of claim 18, further comprising monitoring pressure in the first container and controlling heating with a PID loop.

20. The method of claim 17, wherein the second container is a constant-pressure cylinder, and transferring occurs by compression of the cylinder.

21. The method of claim 17, wherein transferring comprises pumping vapor from the second to the first container.

22. The method of claim 17, wherein transferring comprises cycling vapor through an intermediate constant-pressure cylinder using a valve.

23. The method of claim 17, wherein controlling comprises maintaining a pressure setpoint within ±10% of a target value correlated to a desired composition tolerance.

24. A system comprising the apparatus of claim 1 in combination with a downstream process selected from: a buffer tank, a loading volume, and an electrochemical cell filling station.

* * * * *